April 27, 1948.  G. A. JEFFREYS  2,440,545
PREPARATION OF YEAST AND OF YEAST- AND VITAMIN-RICH PRODUCTS
Filed Nov. 3, 1941
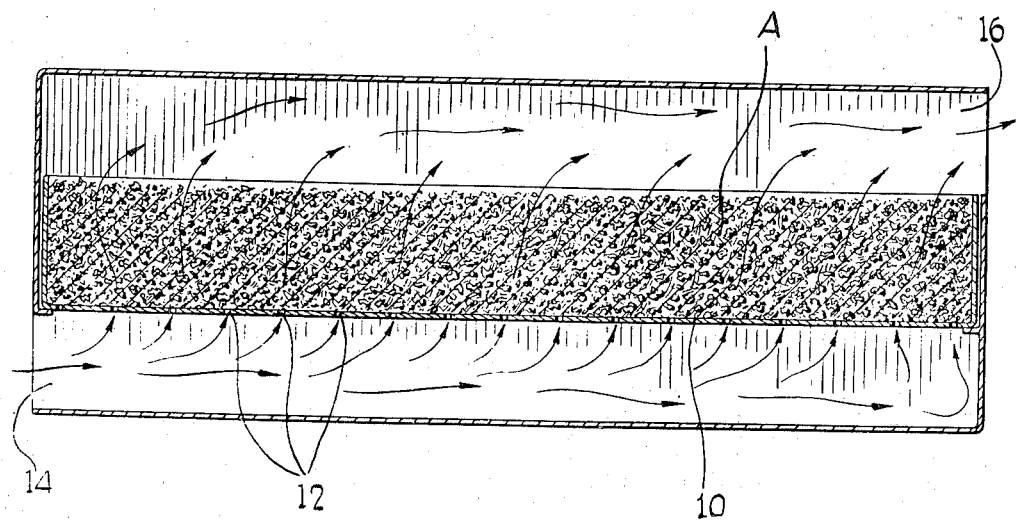
INVENTOR.
GEORGE A. JEFFREYS
BY
*Hammond & Littell*
ATTORNEYS Patented Apr. 27, 1948

2,440,545

UNITED STATES PATENT OFFICE 2,440,545

PREPARATION OF YEAST AND OF YEAST-
AND VITAMIN-RICH PRODUCTS

George A. Jeffreys, Salem, Va., assignor, by direct and mesne assignments, to Nelson Littell, New Canaan, Conn.

Application November 3, 1941, Serial No. 417,708

11 Claims. (Cl. 195—82)

This invention relates to new processes for the preparation of yeast and vitamins of the B complex, and to new products and by-products of such processes.

The preparation of yeast is usually carried out by growing yeast cells in dilute nutrient solutions, or yeast-worts, while subjecting the liquid to a large amount of aeration. The density of the wort usually is about 2° to 5° Balling. After completion of the culture, the yeast is separated from the liquid medium and prepared in compressed or other form suitable for its intended use. The conditions attending the commercial practice of this process place undesirable restrictions on the extent of the yeast growth, the economy and efficiency of the process and the nature of the products obtainable by its use.

An object of this invention is to provide an improved process for the preparation of yeast, by which enriched yeast may be produced in a more economical and more efficient manner than heretofore.

Anothr object is to provide a new process for the synthesis of vitamin $B^1$ and other vitamins of the B complex.

A further object is to provide new and useful food products, or enriching ingredients for foods, containing high concentrations of yeast or of yeast and vitamins of the B complex.

Another object of my invention is to provide a process for the production of yeast through the culturing of a yeast-wort wherein the growth of yeast is stimulated and the yield of yeast is increased by culturing the wort in a new manner in the presence of substances which supply factors beneficial to yeast growth and nutrients increasing the extent of yeast growth.

Still another object of my invention is to provide new composite food products, for either human or animal consumption, which are characterized by distinctive physical forms, by a high yeast content and by the presence of beneficial enzymes and vitamin concentrations. A further object is to provide such products from which new and valuable by-products may be prepared.

Other objects and advantages of my invention will be apparent from the following description, which sets forth suitable manners of practicing the same. The invention is intended to be defined in the appended claims.

I have discovered that the preparation of yeast may be carried out efficiently and to considerable advantage over prior practices by growing the yeast in foraminous or air-pervious masses composed of discrete solid particles or granules having a thin coating thereon of a suitable yeast culturing medium, or yeast-wort. By coating suitable particles or granules with a liquid culturing medium that is innoculated with yeast (hereinafter called an "active yeast wort"), forming the particles in masses such that their wort coating is accessible to air, and then incubating the masses under suitable conditions of aeration, I have found it possible to obtain an exceedingly prolific growth of yeast and of valuable vitamin and enzyme factors and also to produce yeast and such factors at a lower cost and greater efficiency than in the case of existing practices of which I am aware.

The granules or particles so used provide a large surface area for retaining the wort in extended thin films, which allows yeast growth to proceed rapidly and substantially to completion under suitable conditions; and the granular characteristic of the coated particles enables masses thereof to be aerated, by movement of air therein between the particles, so as continually to expose a large part of the film coating to conditions favoring the active development of yeast. In this way I find it possible to avoid many restrictions which attend the growth of yeast in liquid media, to maintain a highly effective control over the conditions and results of incubation, and to produce not only yeast for conversion into compressed or other suitable form for use, but also several other valuable new products which are useful as foodstuffs, as enriching ingredients for foods or for other purposes.

The granular materials or particles to be employed, according to the broader aspects hereof, may be of almost any type which is not detrimental to yeast growth. For example, I may use vegetable substances containing very little, if any, nutrients assimilable by yeast, such as sawdust, cut straw, alfalfa chops and the like, or even inert substances like glass beads or stone grit, all of which are more or less effective to provide an extended surface area for retaining a thin film of the wort and exposing it to aeration during the incubation process.

According to the preferred embodiments of this invention, however, I employ particles of substances of vegetable or cereal origin which contain carbohydrates or carbohydrates and proteins assimilable by growing yeast, including comminuted or broken cereal grains, granular by-products of grains, such as soy-bean meal and malt sprouts and, preferably, the brans or coatings and germs from cereal grains, such as wheat bran, rice bran, corn bran, oat hulls, cotton seed hulls and the like. Such substances may be used individually or in various mixtures, depending upon the qualities and uses desired for the cultured product.

By the use of such nutritive substances, I have found it possible to develop yeast not only from the nutrients contained in the wort but also, simultaneously, from nutrients that are derived from the wort-coated particles in the course of the incubation. Particles such as those from the coatings and germs of grains contain comparatively large proportions of carbohydrates and proteins assimilable by yeast. They also have a relatively high content of minerals, nitrogen compounds and substances such as biotin, that stimulate the development of yeast. In embodiments using these, therefore, I obtain a yield of yeast which far surpasses the yield available, by similar treatment, from the wort alone. The efficiency of the process under favorable conditions thus may be as much as 125% or even higher, based on the yield available from nutrients added to the particles in the wort coating.

I have also discovered that vitamins of the B complex may be synthesized in conjunction with the yeast development, to an extent far greater than is attributable to the yeast development itself, by employing granules or particles, such as cereal brans and the like, which initially contain such vitamin factors. In such cases the vitamin content of the material has been found to be greatly increased in the course of the incubation. The present process, in its best embodiments, therefore produces valuable products rich in yeast and vitamin $B^1$, from which the yeast and the vitamins may be separated for utilization in various ways. When edible granules such as brans are employed, the yeast and vitamins may be left on the particles as constituents of new composite food products having various beneficial qualities and uses, as described more particularly hereinafter.

The wort or culturing medium used for coating the granules may be of any type suitable for yeast growth, usually containing a base of carbohydrates, such as sugar, starch or starch conversion products, upon which yeast cells thrive. A base predominately of sugars is particularly effective for rapid yeast growth. For example, molasses, sucrose, maltose, starch conversion sugars or the like may be dissolved in water, and to this solution there may be added a small proportion of an inorganic yeast food or stimulant for yeast growth, such as ammonium sulfate, ammonium phosphate, calcium super-phosphate, magnesium sulfate, calcium sulfate or the like. When granular substances rich in minerals are used in the process, the content of yeast food in the solution may be reduced or eliminated altogether, although its inclusion increases the efficiency of the process. The active wort is prepared by adding to such a nutritive solution a small percentage of seed yeast or a suitable yeast culture.

The density of the wort used in this process may be considerably higher than that used when growing yeast in a liquid medium. For example, I usually employ a wort of about 6° to 8° Baumé, although densities higher or lower than this may be used if desired. A further advantageous feature hereof is that the amount of yeast seed or culture required to form the wort is very small in comparison with known methods of growing yeast in liquid media. For example, satisfactory worts may be made with about 0.2% of compressed seed yeast, or so as to contain about 10 million yeast cells per cubic centimeter, whereas at least about fifty times as much compressed yeast is used as seed in such known methods.

The present process is carried out to the best advantage by adhering to certain conditions in the formation of the coated granules and during the period of incubation. The wort coating should be definitely acidic at the outset of and during the treatment, preferably not exceeding pH 6. Also, the temperature of the culturing material should be controlled during the incubation so as not to exceed about 37° C. nor be less than about 25° C. Some departure from these limits is permissible, if not prolonged. This temperature control may be effected readily by regulating the temperature or flow rate, or both, of the air employed to aerate the material. The air should also be nearly saturated with moisture in order to supply moisture to the culturing material and avoid objectionable drying thereof during its development.

In some instances, it may be advantageous to include in the wort, in addition to suitable nutrients and seed yeast or a yeast culture, a small amount of a culture of acid-producing micro-organisms that in developing will synthesize lactic acid or vitamins of the B complex, or both, such as *Bacillus acidophilus, Bacillus bulgaricus, Streptococcus lactis* or other similar organisms. For example, I may add about 0.1% of cultured milk containing the desired organisms.

In general practice, the solid particles or granules employed in the process are moistened and sterilized before being coated with the wort. The moistening step is particularly desirable when using absorbent granules, such as bran, as the granular material. I usually moisten cereal particles with about 50 to 100% as much water, by weight, depending upon their absorption. This step may be utilized to acidify the wort coating, by moistening the particles with an acid solution. Various mineral and organic acids may be used for this purpose, in various amounts and concentrations. When a mineral acid such as sulfuric or phosphoric acid is used, it is advantageous to employ that concentration or amount of solution which will impart a pH of about 5.2 to 6.0 to the coated particles. When an organic acid such as lactic or citric acid is used, a pH of about 4.5 to 5.4 has been found most desirable.

After the granules have been moistened and acidified, they may be pasteurized or substantially sterilized by steaming them for a time sufficient to destroy any living organisms. They are then coated by mixing them with a suitable proportion of the wort, followed by drainage, if necessary, to remove any excess of liquid that might unduly obstruct air passages within the coated mass. In the case of light or compactible particles, such as cereal brans, it is important to perform the mixing so as to keep the mass in a "fluffy," loose, or uncompacted condition.

Any or all of the foregoing operations may be carried out in a batch, semi-continuous or continuous manner, as may be desired. It will be understood, of course, that continuous operations are more efficient for large commercial production. The culturing of the coated mass also may be carried out in various ways, using any type of equipment by which masses or layers of the coated granules may be aerated and incubated effectively. The coated material usually is placed on perforated shelves, in layers or masses several inches thick, and air at a predetermined temperature and humidity is circulated transversely through the shelves and the layers of material thereon. For most efficient operation the depth of the layers usually is about 3" to 8"; greater depths may objectionably retard the air circulation, and smaller depths may reduce unnecessarily the producing capacity of the equipment. Ordinary incubators having imperforate pans or shelves also may be employed, but in such instances the process is not likely to produce the maximum yield of yeast unless the thickness of the layers be small or the layers themselves be extraordinarily pervious to air circulating thereover.

The accompanying drawing illustrates diagrammatically a layer A of coated granules undergoing incubation, wherein the material is held on a tray or shelf 10, having perforations 12 therein, and air is circulated from an inlet 14 through the perforations and the material and then passed off through an outlet 16.

As before mentioned, the temperature of the material during incubation should not exceed about 37° C. nor fall below about 25° C. The optimum range is about 28° C. and 32° C., so that the air preferably is supplied at a temperature within that range. At the outset of treatment only a small amount of air is required, but as incubation progresses the air circulation should be increased to control the temperature of the material and supply the moisture and air required for full yeast growth. To give the yeast a good start I usually begin treating the coated material at about 30 C. and circulate air at about 30° C. in contact therewith. As the incubation progresses, however, heat is generated which would harmfully increase the temperature of the material in the absence of cooling. This heat is dissipated either by lowering the temperature of the air, say to about 26° C., or, preferably, by increasing the volume of air flow. For example, I usually continue to supply air at about 30° C. and increase the rate of air flow, as the incubation progresses, to the extent needed to keep the material within the desired temperature range. The air should be moist enough to prevent substantial drying of the culturing material, a relative humidity above 80% usually being employed.

The culturing of the material is usually continued for a period of at least 18 hours, or until completion of active yeast growth. It may be advantageous to stir the material gently from time to time during this period, particularly where a comparatively thick layer is undergoing treatment. After about the first 8 hours or so of incubation I usually stir the material gently every two or three hours, thereby ensuring thorough aeration of all parts of the wort coating.

After completion of the period of incubation a moist, composite cultured product is obtained which shows a very high content of yeast. When using inert or non-nutritive particles as the granular material, the efficiency of the process may approximate 100%, based on the ratio of actual yeast growth to the growth theoretically available from the nutrients in the wort coating. When using cereal particles which contain assimilable yeast nutrients, the efficiency usually is about 100 to 125%, or more. When the granular material is a vitamin-containing bran or the like, the cultured product also shows large accretions of vitamin $B^1$, the content thereof being increased about 100% to 300%, or more, as well as increases of other vitamins of the B complex.

This moist cultured material may be employed for the production of compressed yeast, or of vitamin B concentrates, or of both; or it may be subjected to various treatments to obtain new food products, enriching ingredients for food products, cultures or other by-products having beneficial qualities and uses. If the composite material is to be used as such, it is first dried in a separate drying apparatus, or in the incubator itself by agitating the material while passing comparatively dry air therethrough at the proper temperature and flow rate. Many well known types of hot air dryers may be used for this purpose.

Some of the characteristics of the dried material depend upon the temperatures employed in the drying operation, and by appropriate control over these temperatures various products of distinctly different nature may be obtained. If it is desired to retain the vitality of the yeast and other organisms contained in the product, drying temperatures are used which will not destroy these, say temperatures not exceeding about 43° C. A product so produced with edible granules may be used to advantage as a base for enriching special foods, or for therapeutic purposes. When vitality of micro-organisms is not desired but it is desired to retain active enzymes in the product, the drying temperature is controlled accordingly, using temperatures, for example, of about 50° C. to 60° C., in which case the yeast and bacteria are inactivated but the enzymes are retained. When the cultured material is dried at temperatures above about 60° C., but not exceeding about 82° C., the yeast, other micro-organisms and enzymes are inactivated without destruction of the vitamins.

Following is an example of the practice of the process herein disclosed for the production of a composite food product containing high concentrations of yeast and vitamins of the B complex: Fifty parts, by weight, of a .75 percent sulfuric acid solution are mixed thoroughly with 100 parts of a granular mixture composed of 80 parts of wheat bran, 10 parts of soy-bean meal and 10 parts of malt sprouts. The resulting moist material is steamed for 10 to 20 minutes and then cooled.

A yeast wort having a molasses nutrient base is made as follows: To 100 parts of water are added 10–25 parts of molasses and ¾ part of ammonium sulfate. The solution is pasteurized by heating to boiling, and then filtered. After the filtrate has cooled sufficiently, about ¼ part of compressed seed yeast are added and mixed in, which is equivalent to about 0.2% of seed yeast in the prepared wort. About 0.1% of cultured milk rich in Bacillus acidophilus also is added to the wort. This wort is then sprayed and mixed thoroughly into the cool, moist bran mixture, in a ratio of about 3 parts of the wort to 4 parts of the solid particles. The mixing is continued until the particles are coated substantially uniformly with the wort, stirring paddles being used at a speed of rotation that imparts a "fluffy" consistency to the mass. The resulting coated material is placed in layers 5" deep on sterilized perforated shelves constituting parts of an enclosed incubating apparatus. The material preferably has a temperature of about 30° C. at this stage.

Culturing is then begun and continued for a period of about 24 hours until the desired growth of yeast and vitamins has been attained, air being circulated through the layers of material on the shelves during the entire period. The air is supplied at a temperature of about 30° C. and a relative humidity of about 90%. Starting at an aeration rate of about ¼ cubic foot of air per minute per 100 pounds of material in the incubator, the air circulation is increased gradually as the incubation progresses to about ½ to 1 cubic foot of air per minute per 100 pounds of material, the actual rate being that which is necessary to keep the material at a temperature between 28° and 32° C. After the first 8 hours of incubation, the material on the shelves is stirred gently for a few minutes every 2 or 3 hours.

When the incubation has been completed the cultured product is dried in the same apparatus by circulating comparatively dry air therethrough, at a temperature of about 75° C., until the moisture content of the material has been reduced to 10 to 12%.

The dried product so obtained is a stable, composite food in which the yeast, lactic organisms and enzymes have been inactivated without adversely affecting the vitamin content. Each gram of the product contains about 200 to 500 million yeast cells. An assay of the product on a dry basis shows about 1500 to 2200 International units of vitamin $B^1$ and about 1600 to 3000 Chick Norris units of riboflavin per pound. This compares with about 700 to 900 International units of $B^1$ and about 900 Norris units of riboflavin per pound in the original dry bran mixture. The product also shows proportionate increases in other vitamins of the B complex group, as determined by chemical assays.

Following is an example of the production of compressed yeast according to the present invention:

After the incubation of any desired wort-coated particles has extended for a period sufficient to produce a high concentration of yeast cells, the cultured material is removed from the incubator, and water is added in an amount sufficient to form a fluid mixture, for example, about four times as much water as material, by weight. The mixture is agitated vigorously for about 5 to 10 minutes. It is then strained, screened or otherwise treated to separate the liquid from the granular particles. For example, the mixture may be strained through a screen of about 20 mesh, after which the residual solids may be passed between rollers or treated in a centrifugal or a filter press, with or without additional water washing, to extract more of the yeast culture. The strained liquid and any extracted liquid are combined and then either settled and decanted, filtered or centrifuged, so as to separate the yeast. The yeast may then be washed, mixed with starchy or other absorbent material and compressed in the usual manner. The filtrate may be pasteurized, clarified and concentrated or otherwise employed as a valuable source of vitamin $B^1$ and other B complex vitamins. A particularly advantageous process for these purposes is disclosed and claimed more particularly in my co-pending application, Serial No. 417,710, filed November 3, 1941.

Although wide variation is permissible, when making the new composite products hereof I usually carry out the drying operation until the product possesses a moisture content of about 8 to 20%. The products so obtained may be kept indefinitely without spoilage or deterioration. Such products, when prepared on granules of edible cereals such as wheat bran, soy-bean meal, etc., serve as an excellent base for enriching cereal breakfast foods, or other foods of a similar nature, in yeast and vitamin B complex. For example, a mixture of 80% cleaned wheat bran and 20% soy-bean meal may be used for this purpose, the moist cultured product being dried at temperatures sufficient to inactivate the bacteria and the yeast without destroying the vitamins, except in special cases where vitality of the organisms is desired. Such a product will substantially enrich cereal foods and the like when added thereto in amounts of about 2 to 25% or more, and the cost of producing the product is so low that its use in this manner is fully warranted. The product may be so used either in its natural granular state or after having been ground to any desired degree of fineness. When used in foods of different texture or physical appearance, it preferably is incorporated in a finely ground state.

Another new product may be a composite bran or cereal product for culturing or baking purposes. In this case edible granules, such as bran or bran mixtures, are coated with a wort and cultured as above described, but in the drying step low temperatures below about 43° C. are used exclusively in order to preserve the vitality of the organisms, particularly the yeast cells. When dried to a moisture content of, say, 8 to 20%, this material can be preserved indefinitely in suitable containers. It may then be used, as desired, for innoculating various types of media for culturing, or as a substitute for compressed yeast in baking. For example, it may be used in amounts of about 25%, more or less, for baking whole wheat bread and other baked goods in which bran may be employed. In this way wholesome, appetising, vitamin-enriched baked products may be produced.

Dried composite products of the process are also useful, with or without added uncultured cereals, in place of ordinary "feeding yeasts" for enriching various animal and poultry foods. The granular particles in such products may include edible foods, such as bran, corn grits, gluten meal and soy-bean meal, as well as malt sprouts and various other grain products suitable for animal consumption. Such particles, e. g., are coated with wort containing molasses as the main sugar and cultured as in other instances, the drying of the cultured product being carried out at either low or high temperatures, as may be desired.

Still other valuable products may be made and used as a binder and an enriching medium in the pelleting of animal and poultry foods. In this case, the granular material containing carbohydrates as aforesaid should consist largely of a substance, such as soy-bean meal or gluten meal, which is comparatively free from fibre and tends to become glutinous. The wort here used may be of comparatively high density, containing 20 to 25 parts of molasses, so as to provide an economical source of sugars possessing adhesive qualities. The drying of the cultured product is carried out to a moisture content of about 16 to 20%, consisting mostly of water of crystallization. As a result of the treatment most of the starches of the original granular material are converted to sugars and changed to a plastic state. The dried product is utilized for pelleting, e. g., by adding about 5 to 10% thereof to the mash or meal to be pelleted. The pressure exerted by the pelleting machine causes a liquefaction of the sugar and an adhesiveness of the proteins that serves to combine the mash or meal into firm, shape-retaining pellets; and by reason of this action the steam or heat ordinarily employed in pelleting operations may be reduced in amount, or even eliminated altogether.

It will be understood by persons skilled in the art that various other products and by-products may be made by the use of the present invention, and also that the invention may be carried out in various ways without restriction to details of the illustrative embodiments set forth hereinabove. I therefore desire that my invention be accorded a scope fully commensurate with its novel contributions to the art, as intended to be set forth in the appended claims.

I claim:

1. A process for producing yeast which comprises forming a coating of an active yeast wort on vegetable granules which contain nutrients assimilable by yeast and aerating and incubating an air-pervious mass of the coated particles while maintaining the mass at temperatures conducive to active yeast propagation.

2. A process for producing yeast and synthesizing vitamin $B^1$ simultaneously which comprises coating cereal particles that contain vitamin B factors with an active yeast wort and aerating and incubating an air-pervious mass of the particles while maintaining the mass at temperatures conducive to active yeast propagation.

3. A process for producing yeast which comprises forming an air-pervious mass of granules coated with an active yeast wort, said mass having a pH between about 4.5 and 6.0, and then aerating the mass while maintaining the mass at temperatures conducive to active yeast propagation.

4. A process for producing yeast which comprises moistening and pasteurizing a mass of granular cereal particles, coating the same with an active yeast wort forming an air-pervious mass of the coated particles and aerating the latter while maintaining temperatures therein conducive to active yeast growth.

5. A process for producing yeast which comprises forming an air-pervious mass of granules coated with an active yeast wort and aerating the mass with moist air at temperatures between about 28° and 32° C. until an abundant growth of yeast has occurred.

6. A process for producing yeast-rich products which comprises coating granular vegetable particles with an acidic active yeast wort containing a culture of lactic acid producing micro-organisms and incubating an air-pervious mass of the coated particles while aerating the same and maintaining the mass at temperatures conducive to active yeast propagation.

7. A process for producing yeast which comprises moistening granular particles of cereal grain with an acid solution and coating the moistened particles with an active yeast wort so as to obtain coated particles having a pH between about 4.5 and 6.0, and then aerating and incubating an air-pervious mass of the coated particles while maintaining the mass at temperatures conducive to active yeast propagation.

8. A process for producing yeast which comprises forming a pasteurized moistened mass of vegetable granules that contain yeast nutrients and forming on said granules a film coating of yeast wort that contains a carbohydrate base and an inoculum of yeast cells so as to obtain a mass of coated granules having a pH of about 4.5 to 6.0, forming air-pervious layers of the coated granules, and then culturing said layers for a prolonged period of hours while forcing therethrough humid air at a temperature maintained between about 25° and 37° C.

9. A process for producing yeast-rich products which comprises forming a mass of moist vegetable granules coated with films of a yeast wort that contains a carbohydrate base and innoculi of yeast cells and lactic acid bacilli, said mass having a pH of about 4.5 to 6.0 and said granules containing yeast nutrients and vitamin B factors, forming air-pervious layers of the coated granules, and then culturing said layers for a prolonged period of hours while forcing therethrough humid air at a temperature and flow rate sufficient to keep the culture between about 25° and 37° C.

10. A process for producing yeast which comprises growing yeast and synthesizing vitamin B factors by forming a mass of moistened and acidified vegetable granules with a film coating of an active yeast wort, said granules containing yeast nutrients and vitamin B factors, forming air-pervious layers of the coated granules at a temperature in the range of 28° and 32° C., incubating said layers while forcing humid air therethrough at a temperature within said range and at a flow rate sufficient to keep the temperature of the culturing material between 25° and 37° C., continuing the incubation until substantial completion of active yeast growth, and stirring said layers periodically during the incubation.

11. A process as described in claim 10 in which the cultured material, after the incubation, is dried at a temperature sufficient to inactivate the cultured organisms without destruction of vitamin $B^1$.

GEORGE A. JEFFREYS.

REFERENCES CITED

The following references are of record in the file of this patent:

UNITED STATES PATENTS

| Number | Name | Date |
| --- | --- | --- |
| 454,586 | Bachman | June 23, 1891 |
| 1,474,674 | Jensen | Nov. 20, 1923 |
| 1,534,387 | Hildebrandt | Apr. 21, 1925 |
| 2,031,668 | Reich | Feb. 25, 1936 |
| 2,031,724 | McKinney | Feb. 25, 1936 |
| 2,095,638 | Jeffreys | Oct. 12, 1937 |
| 2,223,465 | Schultz et al. | Dec. 3, 1940 |
| 2,276,710 | Bennett | Mar. 17, 1942 |
| 2,285,465 | Schultz et al. | June 9, 1942 |
| 2,319,831 | Torrington | May 25, 1943 |

FOREIGN PATENTS

| Number | Country | Date |
| --- | --- | --- |
| 8,021 | Australia | July 6, 1933 |
| 272,447 | Great Britain | Mar. 29, 1928 |

OTHER REFERENCES

The Encyclopedia of Food, pub. by Artemus Ward, 50 Union Square, New York, pages 226, 482. (Copy in Div. 63.)

Petersen, Skinner, and Strong, Elements of Food Biochemistry, Prentice and Hall, Inc., N. Y., 1943, page 229. (Copy in Div. 63.)